United States Patent [19]

Mihalko

[11] Patent Number: 4,937,485
[45] Date of Patent: Jun. 26, 1990

[54] COIL/MAGNET STRUCTURE FOR A BRUSHLESS DC MOTOR

[75] Inventor: Emil S. Mihalko, Lansdale, Pa.

[73] Assignee: HHK, Inc., Chalfont, Pa.

[21] Appl. No.: 926,442

[22] Filed: Nov. 3, 1986

Related U.S. Application Data

[63] Continuation-in-part of Ser. No. 910,567, Sep. 22, 1986, Pat. No. 4,733,118.

[51] Int. Cl.⁵ .................... H02K 7/14; H02K 21/14
[52] U.S. Cl. ............................ 310/208; 310/208; 310/254; 310/268
[58] Field of Search .................. 310/12, 156, 72, 67 R, 310/268, 50, 208, 254, 261, 179

[56] References Cited

U.S. PATENT DOCUMENTS

| | | | |
|---|---|---|---|
| 3,935,909 | 2/1976 | Mabuchi et al. | 173/163 |
| 3,942,054 | 3/1976 | Kristen et al. | 310/179 |
| 4,130,769 | 12/1978 | Karube | 310/46 |
| 4,143,289 | 3/1979 | Williams | 310/156 |
| 4,317,072 | 2/1982 | Goof et al. | 318/138 |
| 4,336,475 | 6/1982 | Morinaga et al. | 310/198 |
| 4,369,383 | 1/1983 | Langley | 310/12 |
| 4,385,248 | 5/1983 | Laskaris | 310/52 |
| 4,393,344 | 7/1983 | Whellams | 318/759 |
| 4,445,061 | 4/1984 | Jackson, Jr. | 310/156 |
| 4,463,276 | 7/1984 | Makamuro | 310/266 |
| 4,547,713 | 10/1985 | Langley et al. | 318/254 |
| 4,551,645 | 11/1985 | Takahashi et al. | 310/46 |
| 4,563,808 | 1/1986 | Lender | 29/596 |
| 4,645,961 | 2/1987 | Malsky | 310/156 |
| 4,667,123 | 5/1987 | Denk et al. | 310/42 |
| 4,692,631 | 9/1987 | Dahl | 310/156 |
| 4,714,851 | 12/1987 | Bertram et al. | 310/156 |
| 4,733,118 | 3/1988 | Mihalko | 310/177 |
| 4,734,603 | 3/1988 | von der Heide et al. | 310/72 |

*Primary Examiner*—Patrick R. Salce
*Assistant Examiner*—D. L. Rebsch
*Attorney, Agent, or Firm*—Woodcock Washburn Kurtz Mackiewicz & Norris

[57] ABSTRACT

A brushless dc motor, suitable for use as a hand-held surgical tool, includes a plurality of coils arranged in a substantially electrically non-conductive environment closely juxtaposed to a plurality of magnets which generate high-intensity, substantially unidirectional magnetic field lines such that the plurality of coils intersect the magnetic field lines at points of substantially maximum strength in order to minimize electrical losses.

6 Claims, 10 Drawing Sheets

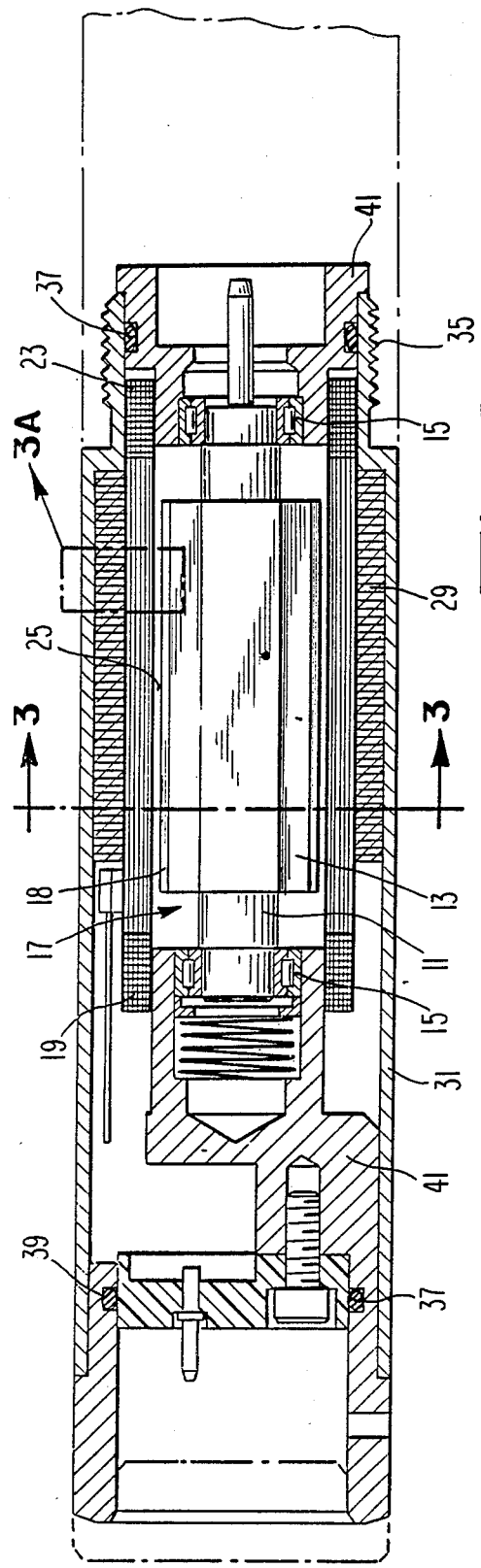
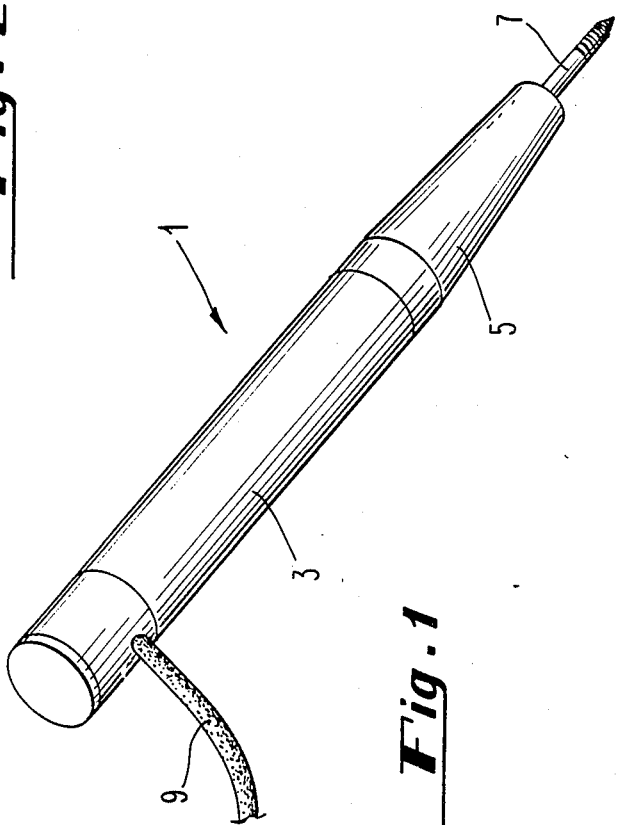
Fig. 1
Fig. 2

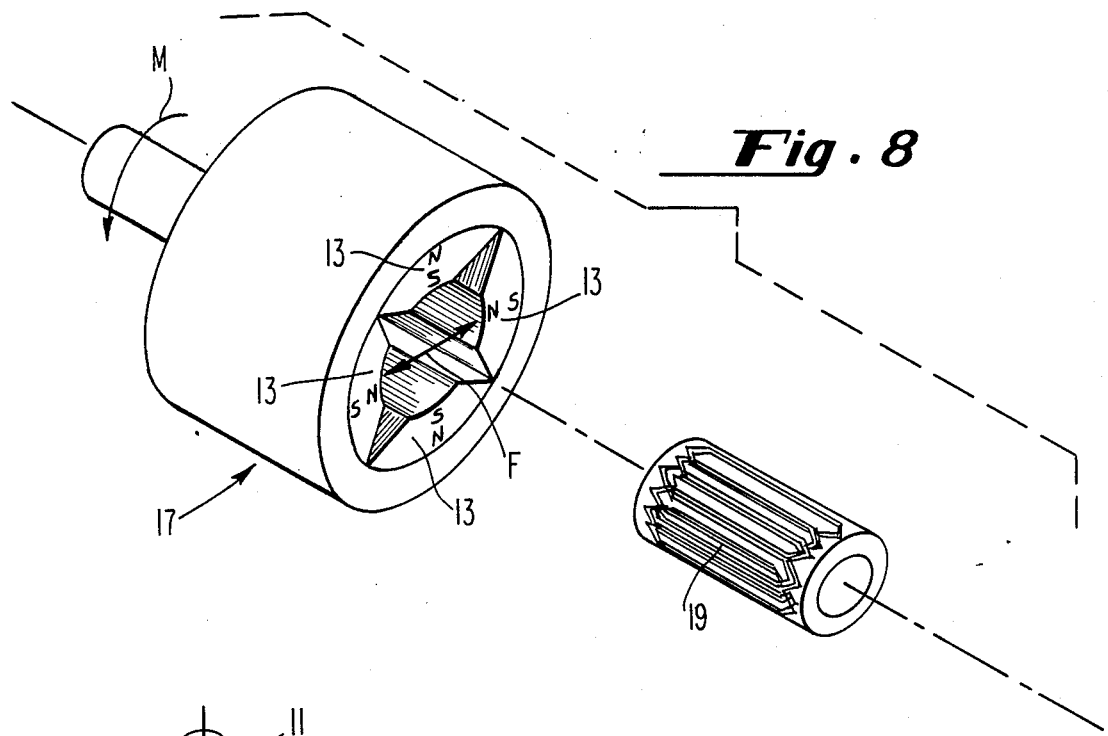
Fig. 8
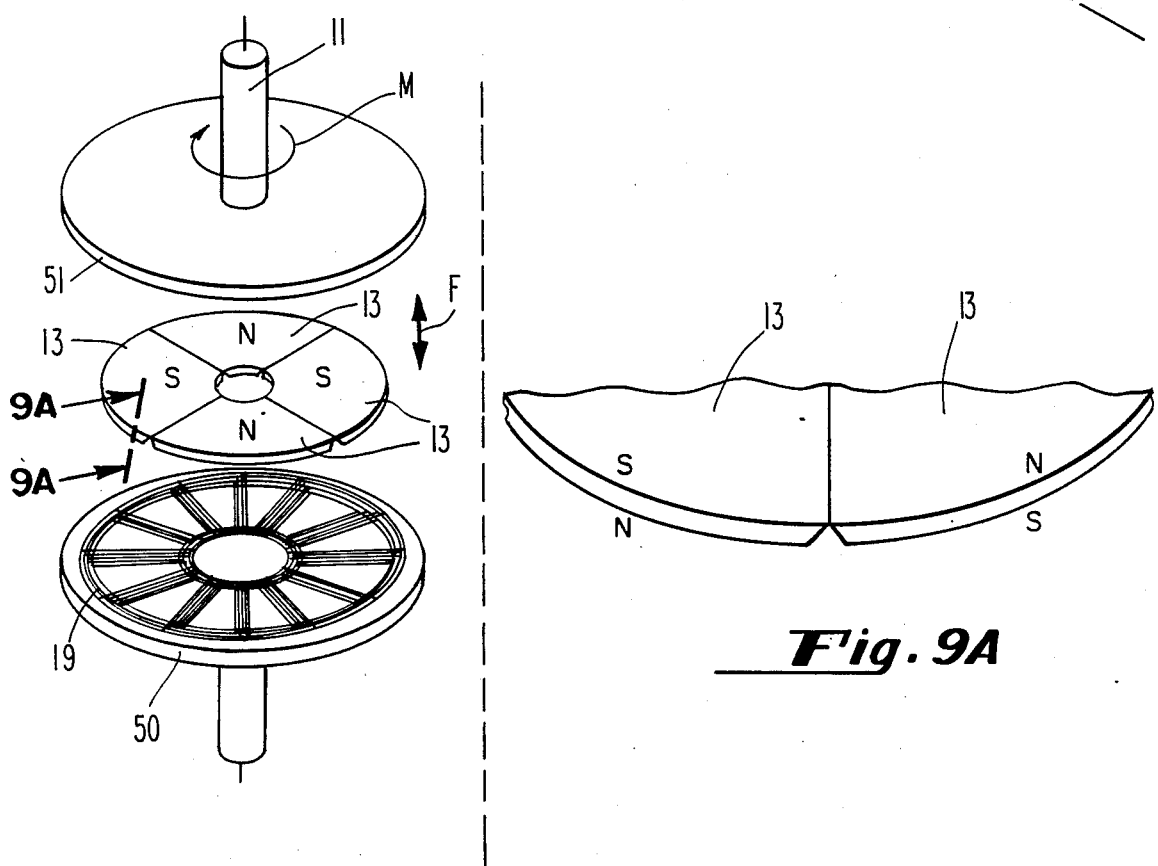
Fig. 9
Fig. 9A

COIL/MAGNET STRUCTURE FOR A BRUSHLESS DC MOTOR

CROSS-REFERENCE TO RELATED APPLICATIONS

This application is a continuation-in-part of U.S. patent application Ser. No. 910,567, filed Sept. 22, 1986, now U.S. Pat. No. 4,733,118 which is assigned to the assignee of the present invention, and incorporated herein by reference.

BACKGROUND OF THE INVENTION

This invention is generally related to direct current (dc) motors, and more particularly to brushless dc motors which are capable of operating at high efficiencies and extremely high speeds while maintaining a relatively low operating temperature.

The advantages that brushless rotary dc motors have over conventional dc motors are well known. In some brushless dc motors, it is usually most practical to provide a stator structure where the windings are placed in an external, slotted stator. The rotor consists of a shaft and a hub assembly with a magnetic structure. Such brushless dc motors produce their output torque via the interaction between a magnetic field produced by the permanent magnet rotor, and a magnetic field due to a dc current in the stator structure.

A conventional rotary dc motor, on the other hand, usually comprises permanent magnets which are situated in an outer stator structure and an inner rotor carrying the various winding coils. When compared with the typical brushless dc motor, it becomes evident that there are significant differences in winding and magnet locations. The conventional dc motor has the active conductors in the slots in the rotor structure, and in contrast, the brushless dc motor has the active conductors in slots in the outside stator. The removal of heat produced in the active windings is, thus, easier to accomplish in a brushless dc motor since the thermal path to the environment is shorter. Furthermore, since the permanent magnet rotor of a brushless motor does not contribute any heating in and of itself, the brushless dc motor is a more stable mechanical device than its conventional dc motor counterpart from a thermal point of view.

Brushless dc motors, just as conventional dc motors, are used to produce mechanical power from electric power. As such, both may be viewed as energy converters. Neither the brushless dc motor nor its conventional counterpart, however, are ideal converters due to various motor losses. Motor losses can generally be classified into two categories: (1) load sensitive losses which are dependent upon the generated torque; and (2) speed sensitive losses which are proportional to the motor's rotational speed.

The load or torque sensitive losses are generally limited to winding losses which are proportional to the square of the current going through the windings times the resistance of the windings. Motors are often wound with copper conductors, or in some of the newer low-inertia type motors, aluminum conductors. With either metal, however, electrical resistance increases with temperature, each at a different rate. Therefore, for a given value of current the winding losses will increase as a motor heats up.

Speed sensitive losses, such as core or iron losses due to eddy currents and hysteresis, windage and friction, short circuit currents, and brush contact, when combined together act as a velocity dependent torque which opposes the output torque of the motor. In brushless dc motors, brush contact losses are obviated as are friction losses between the brushes and commutator of a given conventional dc motor. Iron or core losses due to eddy currents and the hysteresis effect, as well as short circuit currents, remain as dominant losses even in brushless dc motors. As is well known, eddy currents are phenomena caused by a change of magnetic field through a medium that can also support a flow of electric current. In the case of a conventional permanent magnetic motor, the medium that experiences the change of magnetic field in which a voltage potential is induced is the iron of the armature. Likewise, the housing portion of a brushless dc motor also has a voltage potential induced in it and produces currents called eddy currents. In either case, the induced eddy currents which are produced in the iron are proportional to speed, and can have a significant heating effect on the motor particularly when it operates at high speed.

Short circuit currents also contribute a component of loss which increases with motor speed. Motors which are not otherwise limited by their iron losses have speed limitations due to short circuit currents. Eddy currents, short circuit currents and hysteresis determine the maximum speed that may be obtained from conventional dc motors as well as brushless dc motors.

One prior art approach is disclosed in U.S. Pat. No. 4,130,769 —Karube. Karube discloses a brushless dc motor having a rotor composed of a permanent field magnet, an armature coil body containing a plurality of polygonally-shaped coils with a given number of turns, and Hall effect sensors positioned in close proximity to the end face of the magnet. The arrangement of the armature coil body and cylindrical permanent magnet, however, promotes two basic problems which would lead to heat caused by short circuit currents. First, the structure of the magnet yields an ill-defined magnetic field between adjacent poles. Separate and distinct magnets with alternating poles and a highly directional magnetic field would be more preferable to induce a sharp definition between the poles, and thus, minimize short circuit currents as well as promote a more distinct switching effect during commutation and minimize clogging as described further wherein below. Second, the positioning of Hall effect sensors or any other commutation sensing means would more preferably be in the direction of the magnetic field, not as in Karube, perpendicular from the field where only flux leakage would be detected.

Another basic approach is the design of dc low inertia motors which utilize the moving coil concept. This principle basically consists of a multiple d'Arsonval movement with a commutation arrangement. Moving coil structures which are presently used have a multitude of conductors which move in a magnetic field, the armature structure being supported mainly by non-magnetic materials and the active conductors therefore moving in an air gap with a high magnetic flux density. Since the moving coil motor does not have moving iron in its magnetic field, neither iron eddy currents nor hysteresis effects are predominant as heat producing motor losses. Consequently, typical moving coil motors require lower power inputs to obtain high rotational speeds. One major problem with such typical moving coil or low-inertia motors, however, is that their armature-to-housing thermal resistance and housing-to-ambient thermal resistance are greatly different. For example, typical moving coil motors have thermal time constants ranging from about 500 milliseconds to about one second for armature-to-housing, and 30 to 60 minutes for housing-to-ambient. It is readily apparent that the armature of such moving coil motors could be heated to destructive temperatures in less than a minute without the motor's giving any warning because of its long thermal time constant between housing and ambient.

In order to prevent thermal destruction, therefore, air cooling is often provided for moving coil motors. Other forms of heat dissipation, such as cooling the motor with circulating water or oil, have also been employed. As is evident, the use of a moving coil low inertia motor which requires peripheral equipment to cool it would be cumbersome and more costly, especially in applications such as hand-held surgical tools which necessitate light weights and long-term heat dissipation capabilities. It would, therefore, be desirable to provide a brushless dc motor offering high efficiency and good commutation, while at the same time being capable of operating at high rotational speeds for extended periods of time without necessitating the use of forced air or other cooling techniques.

SUMMARY OF THE INVENTION

Accordingly, it is a general object of the present invention to provide a dc motor which requires a low power input to obtain high rotational speeds.

More particularly, it is an object of the present invention to provide a brushless dc motor having an improved efficiency factor while operating at greatly enhanced rotational speeds.

Another object of the present invention is to provide an improved brushless dc motor for applications such as surgical tools which necessitate an ability to withstand the high temperatures and humidity encountered in a sterilizing autoclave.

Yet another object of the present invention is to provide an improved brushless dc motor which is capable of operating at greatly enhanced rotational speeds without requiring peripheral cooling equipment.

Still another object of the present invention is to provide an improved brushless dc motor which is light weight, low-cost, and easy to fabricate.

A further object of the present invention is to provide an improved brushless dc motor characterized by low inductance.

Yet a further object of the present invention is to provide an improved brushless dc motor capable of high speed switching and having a low electrical time constant.

Still a further object of the present invention is to eliminate preferential magnetic positions which can produce variations in torque and speed of the motor due to variations in the magnetic flux as the rotor poles move past the stator poles which is sometimes known a "cogging".

These and other objects of the present invention are accomplished by a brushless dc motor which, instead of using stator lamination with the coils embedded in slots, comprises a plurality of coils mounted in a substantially electrically non-conductive environment closely juxtaposed to a means for generating high-intensity, substantially unidirectional magnetic field lines between at least one pair of adjacent opposing poles, such that the plurality of coils intersect the magnetic field lines at points of substantially maximum strength in order to minimize electrical losses. The motor may include a rotatable shaft, and is adaptable as such in a cylindrical configuration with either the generating means within the coil array or around the exterior of the coil array, a disk-like configuration, or a longitudinal arrangement forming a linear motor.

In accordance with one important aspect of the present invention, the means for generating the magnetic field lines comprises a plurality of permanent magnets which are formed of a material having a high coercive force ($H_c$), thus providing an essentially unidirectional and focussed magnetic field. The magnets may be affixed to the shaft in an abutting manner, thus eliminating exposure of the shaft to the field and thereby minimizing secondary lines of force.

In accordance with another important aspect of the invention, a support stack of very thin insulated laminations may, in certain embodiments, surround the field of coils to provide a magnetic shunt with low eddy current losses. The laminations are preferably comprising an electrical iron having a low core loss at high frequencies. Since the coils are not embedded within a slotted stator, variations in torque and speed of the motor due to variations in the magnetic flux as the rotor poles move past the stator poles, sometimes known as "cogging", are eliminated.

In accordance with yet another important aspect of the invention, each coil includes at least two parallel sides with respective centerlines arranged parallel to the shaft. The coils are thus situated such that both centerlines of one coil cannot be exposed to the same rotor pole polarity simultaneously. That is, the centerlines of one coil are either exposed to adjacent opposing poles or are completely unexposed thereby essentially eliminating short circuit currents. The centerlines of the parallel sides of each coil, in accordance with this aspect of the invention, are thus separated by an angle relative to the shaft that is substantially equal to the equal radial angles at which the circumferentially disposed permanent magnets are positioned about the shaft.

In a presently preferred embodiment of the invention, the improved brushless dc motor is utilized within a hand-held surgical tool. Such applications require the use of light weight materials which will dissipate heat while the motor is operating. Accordingly, in accordance with another important aspect of the invention, it is preferred that an ideal housing which surrounds the motor be comprised of a material which has an infinite electrical resistance with a very high magnetic permeability and zero retentivity. Air satisfies such requirements, but the housing may comprise any such material which is essentially non-electrically conductive. A plastic housing is preferred since it minimizes the heating problems which were present in prior art brushless dc motors. Because the intensity of the magnetic field caused by the permanent magnetic rotor can be 8000 oersteds or higher, its effects are felt at distances outside of the field of coils, thereby inducing a potential across conductive materials within this field. Since the field rotates faster at faster operational speeds, the potential induced at greatly enhanced rotational speeds is eliminated through the use of such a plastic housing.

Other objects, advantages, and novel features of the present invention will become apparent from the following detailed description of a preferred embodiment when considered in conjunction with the following drawings wherein:

BRIEF DESCRIPTION OF THE DRAWINGS

FIG. 1 illustrates a hand-held surgical tool utilizing the improved brushless dc motor of the present invention;

FIG. 2 is a cross-sectional view of the improved brushless dc motor utilized in the hand-held surgical tool shown in FIG. 1;

FIG. 8 is an exploded view of another embodiment according to the present invention;

FIG. 9 is an exploded view of a disk-type motor which incorporates features according to the present invention;

FIG. 9A is a view of an enlarged portion shown in FIG. 9;

DETAILED DESCRIPTION OF THE PREFERRED EMBODIMENTS

Figure 3:
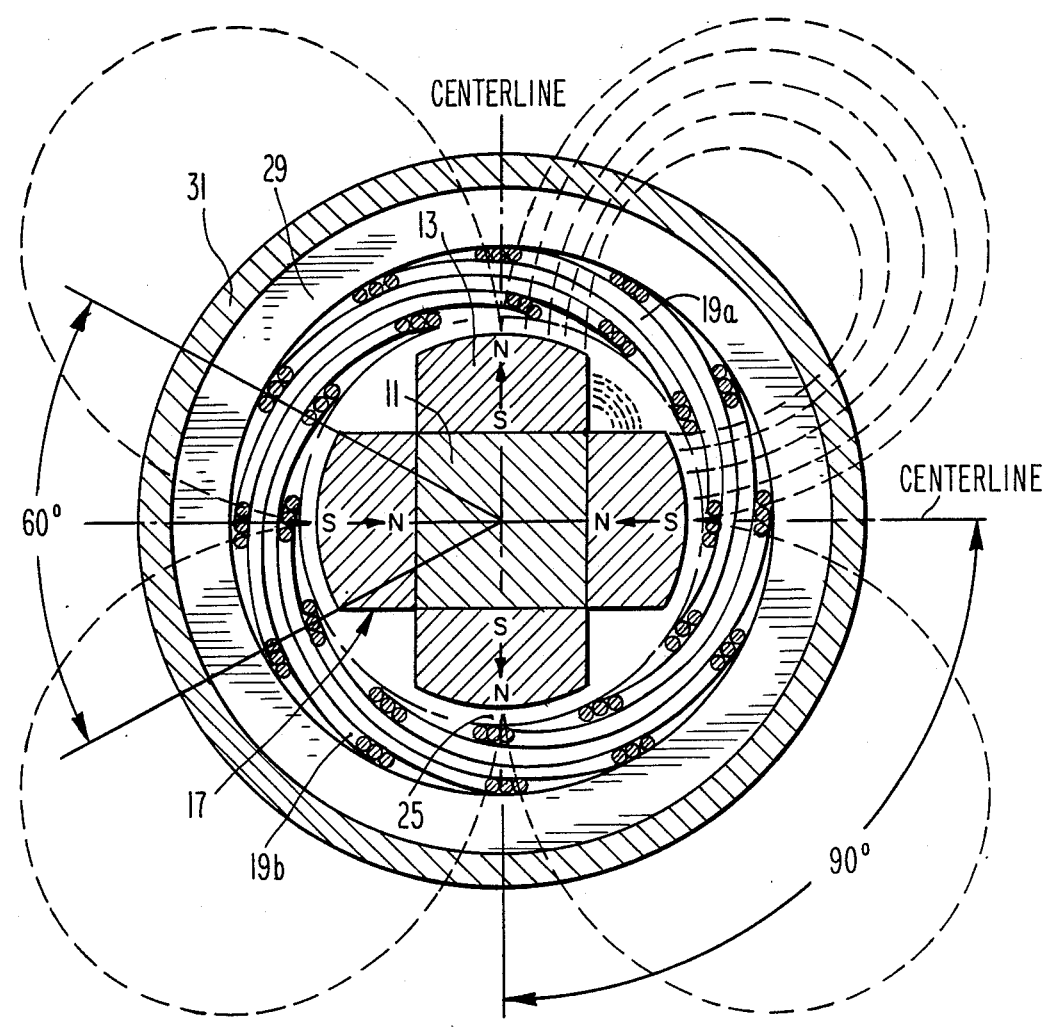
FIG. 3 is a cross-sectional view of the motor shown in FIG. 2 taken along the lines 3—3.

Referring now to the drawings, wherein like characters designate like or corresponding parts throughout the several views, there is shown in FIG. 1 a presently preferred application of the instant invention. A hand-held tool 1, suitable for use in surgical applications, comprises generally a motor portion 3 connected through an adaptor portion 5 to a work piece 7. The tool 1 receives its electrical power through a supply cord 9 attached at one end thereof.

As is shown more clearly in FIG. 2, the motor portion 3 includes a rotatable shaft 11 having a plurality of permanent magnets 13 radially mounted about its surface, the shaft 11 being supported between a pair of bearings 15. The magnets 13 preferably comprise a high coercive force magnetic material (i.e., more than 3000 oersteds and preferably more than 5000 oersteds and still more preferably greater than 10,000 oersteds) such as a rare-earth material, and are bonded to the shaft 11. In one embodiment, this may be accomplished by a suitable adhesive, such as a P2 resin and SB activator, manufactured by Columbus Adhesive & Chemical Company. The rotor 17 comprising the magnets 13 and the shaft 11 is then ground to a predetermined diameter suitable for use in a particular tool 1. For additional support in high speed applications, the rotor 17 can be encased with a non-electrical and non-magnetic material 18.

Figure 3A:
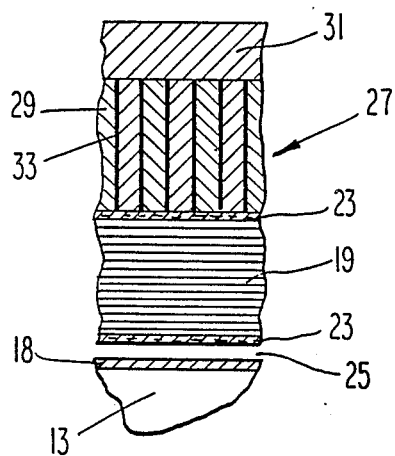
FIG. 3A is an enlarged portion of FIG. 2 showing details of a field coil-laminations-housing arrangement in accordance with one embodiment of the present invention.
Figure 3B:
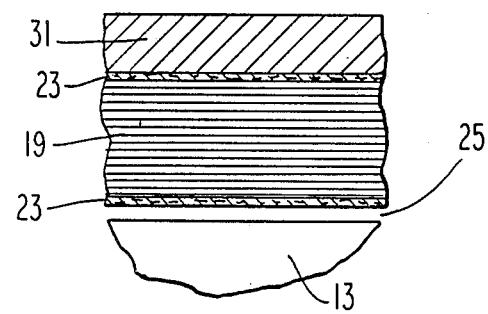
FIG. 3B shows details of another embodiment according to the present invention.
Figure 4:
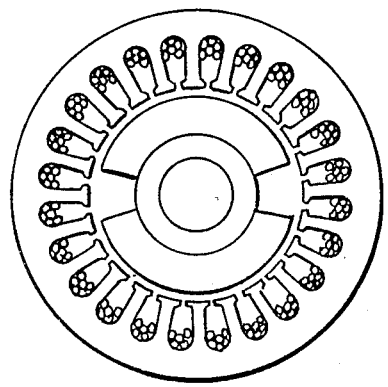
FIG. 4 is a cross-sectional view of a conventional brushless dc motor according to the prior art.

A plurality of coils 19, is mounted in a cylindrical array around the rotor 17. While the array of coils 19 may be joined together by any substantially ferromagnetic free material, in a preferred embodiment the array is formed between a pair of pre-impregnated sheets 23 of a non-ferrous material such as fiberglass. As is shown more clearly in conjunction with FIGS. 3, 3A and 3B, the coils 19 are arranged within the air gap 25 of the motor portion 3, thus avoiding the use of stator laminations where the coils are typically embedded within slots as shown in FIG. 4, and reducing the inductance of the resultant assembly thereby lowering its electrical time constant so that faster and more efficient switching of the drive current can be achieved by conventional electronic control means.

In order to provide a low eddy current return path, as well as a magnetic shunt, a stack 27 for the coils 19 may be provided by a plurality of insulated laminations 29. The insulated laminations 29 comprises electrical grade iron having a low core loss at high frequency, and are suitably from 0.006 inches to 0.007 inches thick and preferably even thinner. Typical prior art approaches which have utilized laminations require laminations on the order of 0.025 inches thick made of soft iron which has been annealed, thus raising its magnetic saturation point. Electrical grade iron, on the other hand, is critical to the practice of the instant invention because of the intensity of the magnetic field produced by the high coercive force magnets is so great that it reaches out past the motor portion 3 and induces a potential across any conductive material. The electrical grade iron, insulated laminations 29, thus provide a controlled magnetic shunt.

Also, in accordance with one important aspect of this invention, the optimum material for a housing 31 which contains the motor portion 3 is one which has a high (ideally infinite) electrical resistance with a very high magnetic permeability and zero retentivity. An infinite resistance eliminates heat caused by eddy current losses, high permeability forms a maximum magnetic return path, and zero retentivity yields no hysteresis losses. A ferrite material comes close to meeting these requirements, but any material that is substantially non-electrically conductive is suitable for the housing 31. In a presently preferred embodiment of the instant invention, the housing 31 comprises a plastic material such as a glass-filled, engineering grade plastic. Such materials should be thermally stable at high temperatures and have a low temperature coefficient of expansion.

Referring again to FIGS. 3A and 3B, it can be seen that the present invention may be practiced with or without the stack 27. Stator laminations used in typical brushless dc motors are generally on the order of from 0.020 to 0.030 inches thick. However, in accordance with the embodiment of the present invention which utilizes the stack 27 of very thin laminations 29 separated one from the other by an insulative oxide coat 33, thin laminations are used as one means of reducing eddy current losses at high frequencies of operation. That is, the laminations 29 are on the order of 0.006 to 0.007 inches thick (or thinner), and separated by the insulative oxide coat 33, in order to reduce the total volume of iron exposed to the field into smaller incremental volumes so as to provide an increased resistance.

Another means for reducing such eddy current losses, as has been discovered during the development of the present invention is to minimize the effects of the high-strength field induced by the rotating magnets 13 upon the housing 31. Conventional brushless dc motors utilize housings made of aluminum or steel, ostensibly to dissipate heat. In reality, such aluminum or steel housings are heat generators because the high-strength, rotating magnetic field produced by the magnets 13 induces a potential in the aluminum or steel housing which causes a current to flow in the housing which in turn results in heat.

One way which has been found to minimize the heat produced by the induced potential in the housing 31, is to make the housing 31 very thin (on the order of 0.020 inches) in cross-section in order to reduce its volume, and increase its resistance. As a result, the increased resistance minimizes the current which passes through the conductive aluminum or steel housing. Ideally, however, the housing 31 comprises a non-conductive material such as plastic, thus obviating the problem of a heat-producing current being induced by the rotating magnetic field.

Figure 3C:
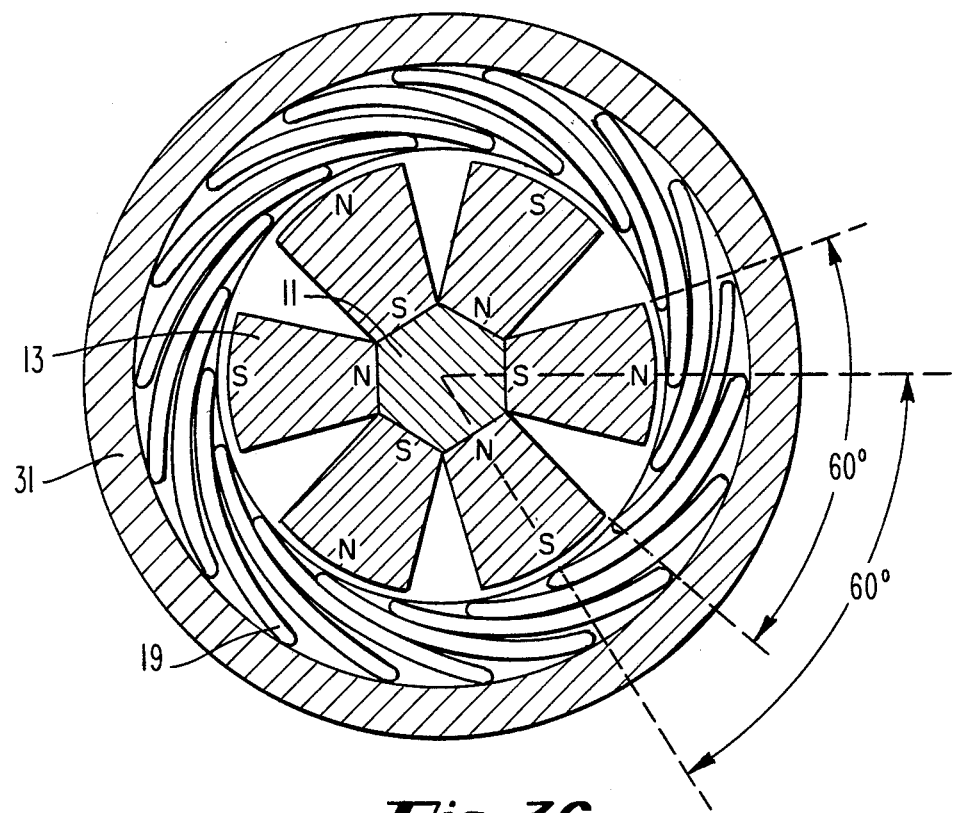
FIG. 3C is a cross-sectional view of a six-pole motor according to the present invention.
Figure 3D:
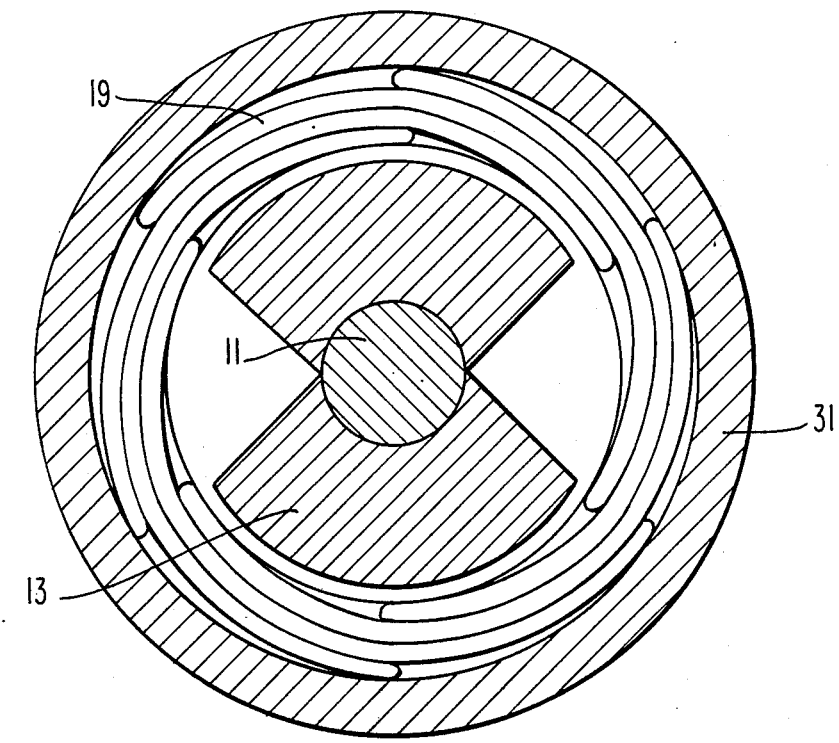
FIG. 3D is a cross-sectional view of a two-pole motor according to the present invention.

Referring again to FIG. 3, the construction of the rotor 17 and its relationship to the geometry of the coils 19 will now be explained. As shown by the dashed lines, a primary field exists across adjacent poles. A secondary field, indicated by dashed-and-dotted lines, also exists beneath the coils 19 where their lines of force do not intersect a conductive medium other than air. The material selected for the magnets 13 is preferably one with a high coercive force ($H_c$) and an essentially unidirectional field (as indicated by the arrows). Rare-earth magnets are preferred with one suitable such material being Neodymium (e.g., NEIGT 27H). Furthermore, in accordance with a most important aspect of the present invention, the magnets 13 are affixed to the shaft 11 without exposing any portion of the shaft 11 to the primary or secondary fields. That is, a portion of one magnet 13 will abut a portion of its next adjacent magnet 13 to eliminate the path of least resistance for the magnetic field. Thus, the secondary field will be substantially reduced. While a four-pole rotor 17 is shown in FIG. 3, any even number of poles may be utilized such that the centerlines of adjacent magnets 13 are separated by 360/N degrees, N being an even number of total poles on the rotor 17. FIGS. 3C and 3D show other exemplary configurations such as a six-pole and two-pole motor.

In accordance with another most important aspect of the present invention, the outer arcuate surface of each magnet 13 ideally spans an arc equal to two-thirds of the arc between adjacent centerlines. For example, in the four-pole rotor 17 shown in FIG. 3, the centerline of each magnet 13 is ninety degrees from the next adjacent magnet 13. Therefore, the outer arcuate surface of each magnet 13 spans substantially sixty degrees (60°). Likewise, in the six-pole motor shown in FIG. 3C the centerlines are separated by sixty degrees while the outer arcuate surfaces equal approximately forty degrees, and in the two-pole motor shown in FIG. 3D, 180 and 120 degrees respectively.

Figure 7:
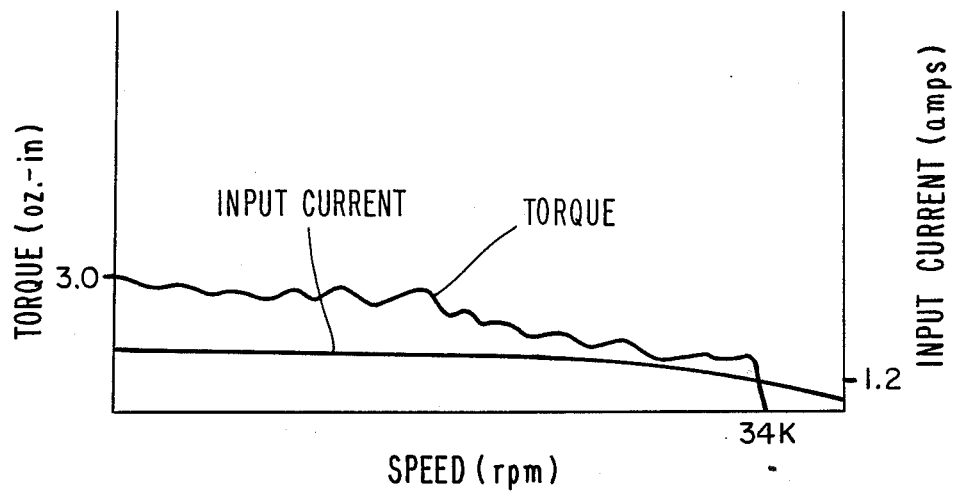
FIG. 7 illustrates the operating characteristics of a motor according to the present invention.

As also can be seen from FIG. 3, the width of each coil polarity 19 is such that both sides thereof will not be exposed to the same polarity pole at the same time. That is, the coil 19 is either exposed to adjacent poles (e.g., 19a), or is completely "off" the poles (e.g., 19b). The angles between the centerlines of the mid-point of both sides of the coil 19 must be substantially equal to the angle between the center of the mid-point of the adjacent magnets for maximum torque output. This arrangement reduces the short circuit currents which would otherwise be generated if both sides of the coil were under one pole. One motor built in accordance with the present invention was operated at speeds of up to 70,000 rpm for periods of time in excess of ten minutes continuous operation without noticeable heat rise. The efficiency of that motor, as measured in dynamometer tests shown in FIG. 7 exceeded 90% independent of dynamometer losses with a torque output of three ounce-inches. This efficiency compares with typical prior art brushless dc motors having efficiencies of less than 50%, and maximum continuous rotational speeds of approximately 10,000 rpm, and severely limited periods of continuous operation due to heat build-up. This present invention results in a very low inductance in relation to the output torque and physical size, the inductance of less than 40 microhenries comparing to an inductance of approximately 6 millihenries for a prior art motor. This lower inductance results in lower electrical time constants with the result that high speed switching is facilitated. The motor of this invention has an electrical time constant which is reduced by a factor of 100 over the prior art.

Referring again to FIG. 2, it can be seen that the motor portion 3 is coupled to the adapter portion 5 by threads 35 formed at one end of the motor portion 3. Since the preferred embodiment of the present may be suitably used as a surgical tool, thus requiring sterilization, a pair of O-rings 37 are provided within annular slots 39 formed upon respective bearing mounts 41. The assembled tool 1 is, thus, capable of withstanding the high humidity, high temperature (e.g., 270° F.) atmosphere of an autoclave.

Figure 5:
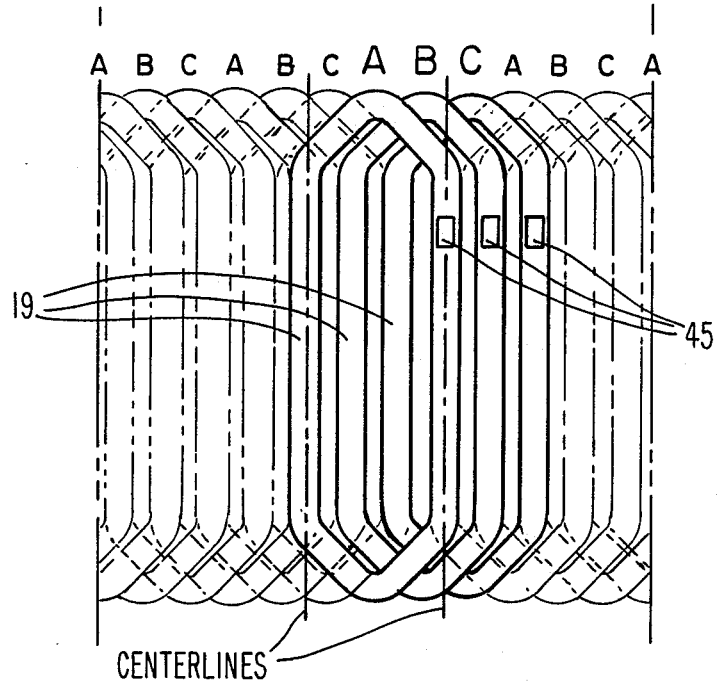
FIG. 5 illustrates the interleaving of the coils and placement of commutation sensors thereon.
Figure 6:
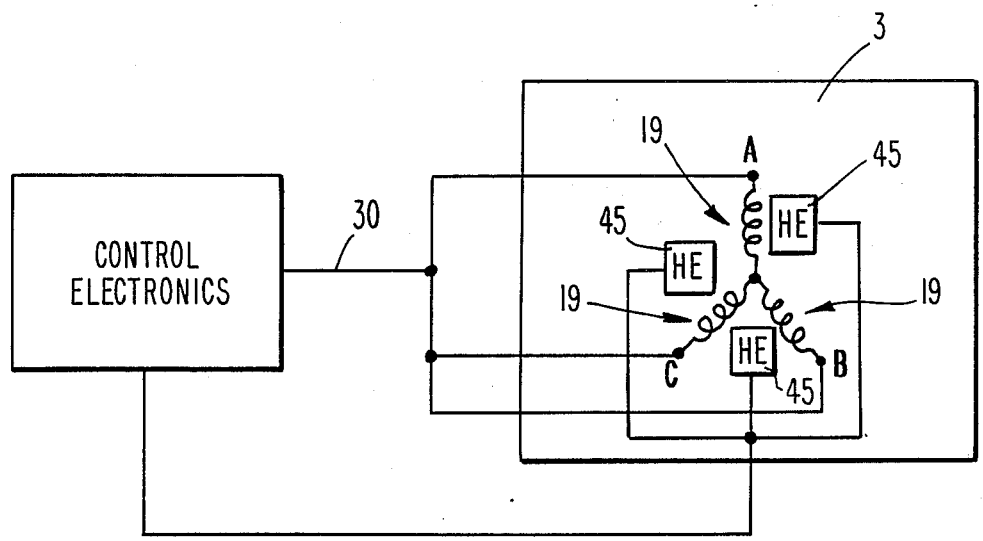
FIG. 6 is a simplified block diagram illustrating the control electronics.

In one embodiment, a plurality of connector pins 43 are used to electrically connect the coils 19 and three conventional Hall effect sensors 45 (FIG. 5) for a means of effecting a commutation of the motor portion 3. As is shown in FIG. 5, the sensors 45 are mounted on preselected ones of the coils 19. For example, the three phase, four pole system shown in FIG. 5 illustrates the interleaving of twelve coils 19, four for each of three phases A, B and C, with a sensor 45 placed on one each of the three coils 19 representing a given phase A, B, and C. The Hall effect sensing system provided by the sensors 45, as is conventional, detects the magnitude and polarity of a magnetic field. The signals are then amplified and processed to form logic compatible levels for the conventional control electronics shown in FIG. 6. In typical brushless dc motors which utilize Hall effect sensors for commutation, the sensors are usually mounted in the stator structure where they sense the polarity and magnitude of a secondary magnetic field in the air gap or as claimed in the Karube patent where a leakage field is used for commutation. In the case of the Karube patent, the leakage fields are very weak and ill-defined thereby resulting in erratic commutation. In the case of the secondary magnetic field method, an error due to the secondary magnetic field is introduced between the sensing field and the primary field. Since the present invention eliminates secondary fields, the sensing is very accurate since it measures only high coercive force, unidirectional primary fields. The outputs of these sensors 45 control the logic functions of the controller configuration to provide current to the proper coil in the stator.

Another drawback for both prior art methods with such a location for the Hall effect sensors is that they become subject to high stator temperature conditions which may affect the Hall effect switching performance, therefore becoming a system performance limitation. However, since the motor portion 3 of the present invention significantly reduces the operational temperatures experienced by the coils 19, the Hall effect sensors 45 in accordance with yet another important aspect of the invention are located directly upon the coils 19 as shown in FIG. 5. Also, the highly focussed magnetic field produced by magnets 13 enable a clean, crisp commutation output. This commutation is an important advantage over the present diffused magnetic fields which could erratically trigger the Hall effect sensors thereby creating a varying waveform which makes it more difficult for the controller to commutate properly. As a result, there is less efficiency. The Hall effect sensor is ideally placed directly on the coil 19, but in any event should be arranged radially outward therefrom.

It is apparent from the foregoing that an improved brushless dc motor is provided by the present invention in which an array of coils 19 are situated about a rotor 17 comprised of a plurality of magnets 13 affixed to a rotatable shaft 11, thus resulting in a lower electrical time constant so that faster and more efficient switching of the current driving the coils 19 can be achieved by a conventional controller and drive unit. Because in one embodiment the support stack 27 comprises very thin laminations 29 separated by an insulative oxide coat 33, or in accordance with the preferred embodiment of the present invention where a very thin, conductive or non-conductive or plastic housing is employed, the overall inductance of the motor portion 3, is reduced. Furthermore, a low eddy current return path and magnetic shunt is provided, thereby reducing eddy current losses and their resultant heat. Because the conventional stator slots, as shown in FIG. 4, are eliminated by arranging the coils 19 in a substantially electrically non-conductive environment in the air gap 25 of the motor portion 3, no cogging or preferred position is experienced. That is, variations in torque and speed of the motor due to variations in the magnetic flux caused when the poles of the rotor 17 move past the stator poles are eliminated.

As can be appreciated from FIGS. 8, 9, 9A, 10 and 10A, other brushless dc motor configurations may incorporate the teachings of the present invention and thereby become more efficient while operating at higher speeds than their conventional counterparts. For example, FIG. 8 illustrates a rotary-type motor with the rotor 17 and its permanent magnets 13 surrounding an array of coils 19. A disk-type motor is shown in FIG. 9 with the coils 19 being supported on a substantially electrically non-conductive disk 50 and the magnets 13 being supported on a ferromagnetic disk 51. As shown in FIG. 9A, the edges of each magnet 13 are tapered such that the ferromagnetic disk 51 is not exposed, thereby minimizing electrical losses due to short circuit currents, and focussing the substantially unidirectional primary field lines.

Figure 10:
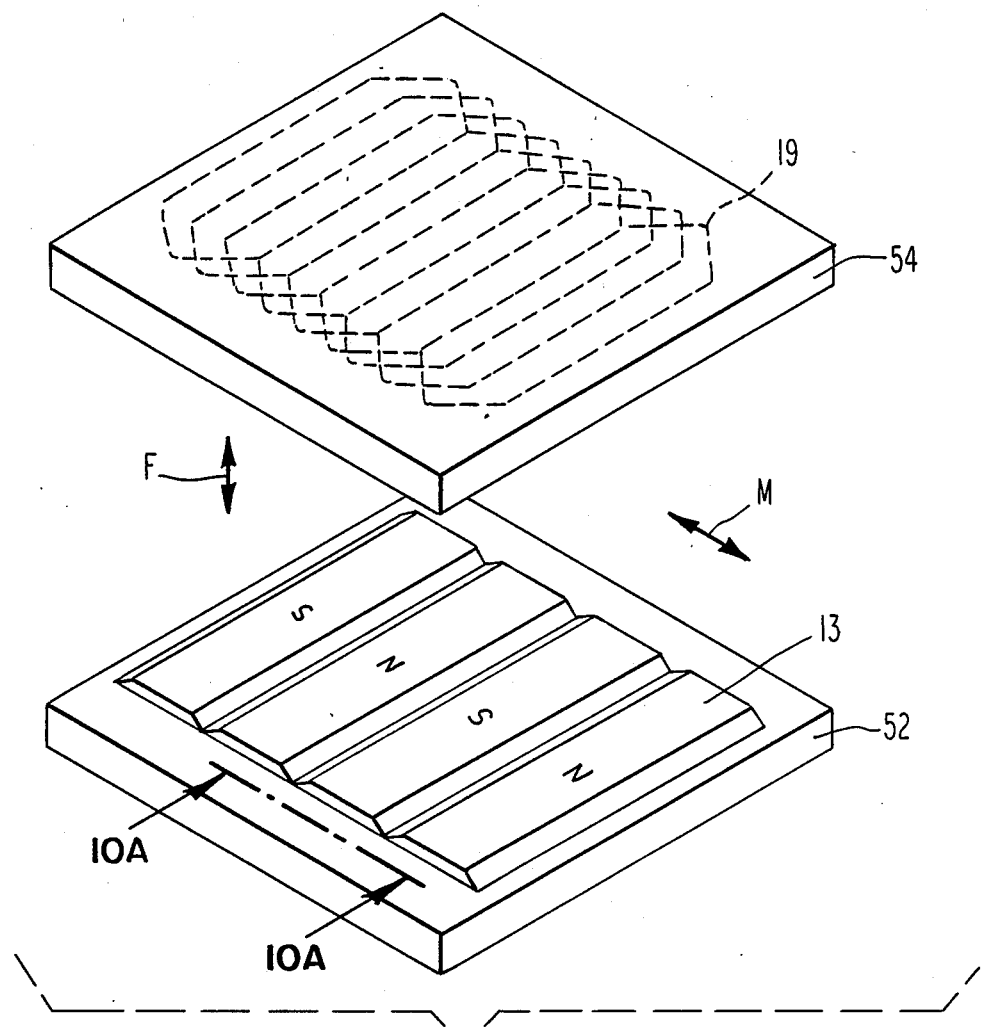
FIG. 10 is an exploded view of a linear-type motor which incorporates features according to the present invention.
Figure 10A:
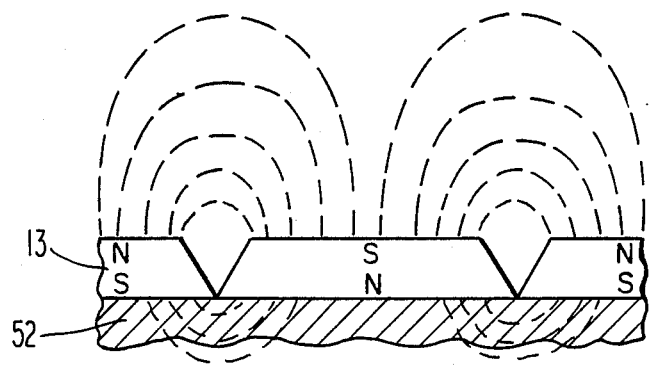
FIG. 10A is a cross-section view of an enlarged portion shown in FIG. 10.

A linear-type embodiment of the present invention is shown in FIG. 10 and 10A with the coils 19 and magnets 13 being mounted on planar surfaces 54 and 52 respectively, the planar surface 52 moving longitudinally as the magnets 13 interact with the energized coils 19. FIG. 10A shows the edges of abutting magnets 13 which are tapered for the same reasons stated with reference to FIG. 9B. The substantially unidirectional fields produced by the magnets 13 in each of FIGS. 8, 9, 9A, 10, and 10A are indicated by bold arrows F, while directions of motion provided by the motors are indicated by arrows M.

Obviously many modifications and variations of the present invention are possible in light of the above teachings. For example, the embodiments shown in FIG. 9 and 10 could include magnets 13 disposed on both sides of the coils 19 without deviating from the true spirit of the invention. It is therefore to be understood that within the scope of the appended claims, the invention may be practiced otherwise than as specifically described.

What is claimed is:

1. A brushless dc motor, comprising:
   means for generating high-intensity, substantially unidirectional magnetic field lines between at least one pair of adjacent opposing magnetic poles; and
   a plurality of coils mounted in a substantially electrically non-conductive environment closely juxtaposed to said generating means, and adapted to intersect said magnetic field lines at points of substantially maximum strength thereby minimizing electrical losses, each said coil having a width that is substantially equal to a distance said adjacent opposing poles;
   wherein said means for generating said magnetic field lines and said plurality of coils are mounted for relative motion about an axis of rotation, and wherein said magnetic field lines being generated are substantially parallel to said axis of rotation.

2. A brushless dc motor, comprising:
   means for generating high-intensity, substantially unidirectional magnetic field lines between at least one pair of adjacent opposing magnetic poles; and
   a plurality of coils mounted is a substantially electrically non-conductive environment closely juxtaposed to said generating means, and adapted to intersect said magnetic field lines at points of substantially maximum strength thereby minimizing electrical losses, each said coil having a width that is substantially equal to a distance between said adjacent opposing poles;
   wherein said means for generating said magnetic field lines and said plurality of coils are mounted for relative linear motion.

3. The brushless dc motor according to claim 2, wherein said generating means comprises:
   a plurality of dipolar magnets linearly disposed along an axis of linear motion.

4. A brushless dc motor, comprising:
   means for generating high-intensity, substantially unidirectional magnetic field lines between at least one pair of adjacent opposing magnetic poles; and
   a plurality of coils mounted in a substantially electrically non-conductive environment closely juxtaposed to said generating means, and adapted to intersect said magnetic field lines at points of substantially maximum strength thereby minimizing electrical losses;
   wherein each of said coils comprise electrical conductors formed in an array having a predetermined number of turns and including at least two parallel sides with respective centerlines spaced by a predetermined distance, and being substantially perpendicular to said magnetic field lines, wherein said poles in each said pair closely juxtaposed to said coils are spaced by a distance substantially equal to said predetermined distance, and wherein said distance between said poles is measured along a line.

5. An improved brushless dc motor, comprising:
a rotor including a plurality of dipolar permanent magnets and a rotatable shaft, said permanent magnets being circumferentially disposed around said shaft and having radially disposed arcuate surfaces so as to generate high-intensity, substantially unidirectional magnetic field lines at said arcuate surfaces; and
a plurality of coils mounted in a cylindrical array around said rotor without any intervening ferromagnetic material between said coils;
said coils being closely juxtaposed to said arcuate surfaces of said magnets so as to intersect said high-intensity magnetic field lines substantially at said arcuate surfaces, thereby minimizing electrical losses;
wherein each of said coils comprise electrical conductors formed in an array having a predetermined number of turns and including at least tow parallel sides with respective centerlines arranged parallel to said shaft, wherein said permanent magnets being circumferentially disposed around said shaft are positioned at equal radial angles, wherein said centerlines are separated by an angle substantially equal to said radial angles, and wherein each of said permanent magnets comprises an arcuate surface juxtaposed to said coils, said surface representing an angle substantially equal to two-thirds of said radial angles.

6. An improved brushless dc motor, comprising:
a rotor including a plurality of dipolar permanent magnets and a rotatable shaft, said permanent magnets being circumferentially disposed around said shaft and having radially disposed arcuate surfaces so as to generate high-intensity, substantially unidirectional magnetic field lines at said arcuate surfaces; and
a plurality of coils mounted in a cylindrical array around said rotor without any intervention ferromagnetic material between said coils, each said coil having a radial width that is substantially equal to one of said arcuate surfaces;
said coils being closely juxtaposed to said arcuate surfaces of said magnets so as to intersect said high-intensity magnetic field lines substantially at said arcuate surfaces, thereby minimizing electrical losses;
wherein said plurality of dipolar permanent magnets are disposed around said plurality of coils radially outward from said shaft.

* * * * *

UNITED STATES PATENT AND TRADEMARK OFFICE
CERTIFICATE OF CORRECTION

PATENT NO. : 4,937,485

DATED : June 26, 1990

INVENTOR(S) : Emil S. Mihalko

It is certified that error appears in the above-identified patent and that said Letters Patent is hereby corrected as shown below:

Column 10, line 27, after "distance" insert -- between --;

Column 11, line 23, delete "tow" and insert therefor -- two --.

Signed and Sealed this

Twenty-fourth Day of December, 1991

*Attest:*

HARRY F. MANBECK, JR.

*Attesting Officer*      *Commissioner of Patents and Trademarks*